United States Patent
Darby et al.

(10) Patent No.: US 12,134,374 B2
(45) Date of Patent: Nov. 5, 2024

(54) BRAKING DEVICE

(71) Applicant: Goodrich Actuation Systems Limited, Solihull (GB)

(72) Inventors: Jonathan A. Darby, Westlands (GB); Colin R. Harrison, Wolverhampton (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 132 days.

(21) Appl. No.: 17/836,031

(22) Filed: Jun. 9, 2022

(65) Prior Publication Data
US 2022/0402464 A1    Dec. 22, 2022

(30) Foreign Application Priority Data
Jun. 18, 2021    (EP) .................................... 21275084

(51) Int. Cl.
*B60T 1/06* (2006.01)
*B64C 9/24* (2006.01)
(Continued)

(52) U.S. Cl.
CPC .............. *B60T 1/062* (2013.01); *B64C 9/24* (2013.01); *B64D 45/00* (2013.01); *F16D 3/10* (2013.01);
(Continued)

(58) Field of Classification Search
CPC .... B64C 9/16; B64C 9/18; B64C 9/20; B64C 9/22; B64C 9/24; B64C 9/26
See application file for complete search history.

(56) References Cited

U.S. PATENT DOCUMENTS

| | | | |
|---|---|---|---|
| 8,319,384 | B2 | 11/2012 | Hanlon et al. |
| 10,883,554 | B2 | 1/2021 | Kracke |

(Continued)

FOREIGN PATENT DOCUMENTS

| | | | |
|---|---|---|---|
| DE | 102006000746 A1 | 7/2007 | |
| EP | 3480070 A1 | 5/2019 | |
| EP | 3480070 B1 * | 10/2020 | ............. B60T 1/062 |

OTHER PUBLICATIONS

Abstract for DE102006000746 (A1); Published: Jul. 5, 2007, 1 page.

(Continued)

*Primary Examiner* — Timothy D Collins
*Assistant Examiner* — Eric Acosta
(74) *Attorney, Agent, or Firm* — CANTOR COLBURN LLP

(57) ABSTRACT

A brake device for braking rotation of an input shaft includes a selectively operable trigger brake that includes: a static element; a trigger brake shaft mounted for rotational and axial movement relative to the static element and the input shaft; a preloaded torsion spring rotationally coupled to the input shaft but permitting a limited rotational movement between the trigger brake shaft and the input shaft; a roller jamming mechanism operable upon the relative rotation between the trigger brake shaft and the input shaft exceeding a predetermined amount to stop rotation of the input shaft upon operation of the trigger brake; and a brake actuator for selectively moving the trigger brake shaft into and out of engagement with a contact surface of the static element. Engagement of the contact surface of the static element and the trigger brake shaft overcomes the preload of the torsion spring.

16 Claims, 7 Drawing Sheets

(51) Int. Cl.
*B64D 45/00* (2006.01)
*F16D 3/10* (2006.01)
*F16D 3/72* (2006.01)
*F16D 121/14* (2012.01)
*F16D 125/36* (2012.01)

(52) U.S. Cl.
CPC ............ *F16D 3/72* (2013.01); *F16D 2121/14* (2013.01); *F16D 2125/36* (2013.01)

(56) References Cited

U.S. PATENT DOCUMENTS 10,900,526 B2  1/2021  Davies
2003/0019708 A1  1/2003  Goto et al.

OTHER PUBLICATIONS

European Search Report for Application No. 21275084.8, mailed Dec. 1, 2021, 9 pages.

* cited by examiner

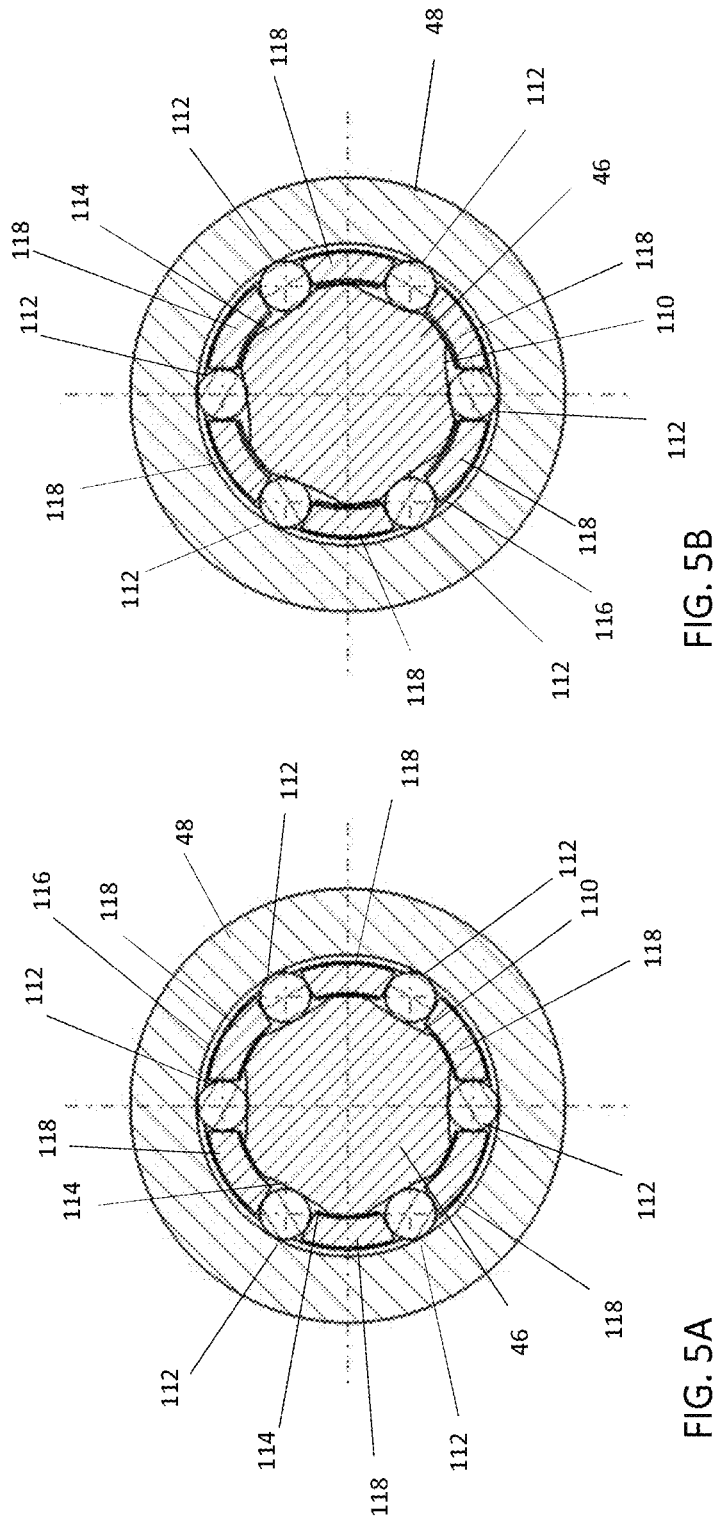

BRAKING DEVICE

CROSS REFERENCE TO RELATED APPLICATIONS

This application claims priority to European Patent Application No. 21275084.8 filed Jun. 18, 2021, the entire contents of which is incorporated herein by reference.

TECHNICAL FIELD

The present disclosure relates to braking devices as may be used, for example, in aircraft actuator systems.

BACKGROUND

Braking devices are used in a wide variety of applications. One such application is in aircraft, where an Out Board Brake (OBB) is used on actuator systems such as leading edge slat systems or trailing edge flap systems to lock the actuator system in the event of various mechanical failure modes within the system, for example, a transmission shaft failure.

When not in a braking mode, the brake may still provide drag on the actuator system which represents both a burden to the system's power drive unit and also a component of torque that is additive to the fatigue duty of the transmission system between the power drive unit and the brake. Current brakes typically employ multiple static and dynamic friction plates which are fully effective as a brake but which exhibit undesirable drag, particularly at low operational temperatures. It would be desirable to minimise the drag exerted by the brake.

It is also desirable in many applications, such as for example in aerospace, to provide braking devices for use in a limited or very narrow space envelope. This may be particularly relevant to thin wing aircraft applications. Accordingly, new brake device arrangements which reduce the weight of the components required, the overall diameter of the braking device provided or the overall size thereof are sought.

SUMMARY

The present disclosure provides a brake device for braking rotation of an input shaft. The device includes: a selectively operable trigger brake that includes: a static element; a trigger brake shaft mounted for rotational and axial movement relative to the static element and the input shaft; a preloaded torsion spring rotationally coupled to the input shaft but permitting a limited rotational movement between the trigger brake shaft and the input shaft; a roller jamming mechanism operable upon the relative rotation between the trigger brake shaft and the input shaft exceeding a predetermined amount to stop rotation of the input shaft upon operation of the trigger brake; and a brake actuator for selectively moving the trigger brake shaft into and out of engagement with a contact surface of the static element. The engagement of the contact surface of the static element and the trigger brake shaft overcomes the preload of the torsion spring so as to produce a relative rotation between the trigger brake shaft and the input shaft to operate the roller jamming mechanism.

In any example of the disclosure, the trigger brake and the brake actuator may be arranged axially adjacent to each other.

In any example of the disclosure, the static element may comprise a housing of the brake device. The trigger brake shaft and/or the brake actuator may be mounted in the housing.

In any example of the disclosure, a radial surface of the trigger brake shaft may be axially engageable with the static element to effect a frictional braking of the trigger brake shaft.

In any example of the disclosure, the brake actuator may comprise an electro-mechanical actuator. In various examples, the brake actuator may comprise an actuating element which is movable between a non-braking position and a braking position under the force of a biasing member, the actuating element being held in the non-braking position against the force of the biasing member when the brake actuator is energised and released upon de-energisation of the brake actuator.

In any example of the disclosure, the brake device may further comprise a carrier member extending parallel to the input shaft, wherein the carrier member is adapted for axial movement relative to the static element and wherein the actuating element is mounted on the carrier member. In examples of the disclosure, the biasing member may be adapted to bias the carrier member and the actuating element axially towards the contact surface of the static element.

In examples of the disclosure, the brake actuator may be mounted relative to the carrier member such that the actuating element is positioned axially between the brake actuator and the trigger brake shaft.

In any example of the disclosure, the brake actuator may comprise one or more solenoids, and/or the actuating element may comprise an annular armature extending around the input shaft.

In any example of the disclosure, the roller jamming mechanism may comprise: a plurality of ramp surfaces provided on the input shaft; a static structure of the device; a plurality of roller elements arranged between the input shaft and the static structure and received between adjacent ramp surfaces; and an actuator coupled to the trigger brake shaft for moving the roller elements along the ramp surfaces upon relative rotation of the trigger brake shaft and the input shaft.

In any example of the disclosure, the actuator may comprise a plurality of teeth extending between adjacent roller elements. In various examples, the teeth may project from one end of the trigger brake shaft.

The disclosure also extends to a drive system comprising a power transmission shaft coupled to or integrally formed with the input shaft of a brake device as described in any of the above examples.

The disclosure also extends to an aircraft actuator system comprising a drive system as above, the power transmission shaft driving a plurality of actuators for deploying or retracting a plurality of slats or flaps in a wing of the aircraft, wherein stopping rotation of the input shaft of the brake device stops rotation of the power transmission shaft and thus deployment or retraction of the slats or flaps.

In various examples of the disclosure, the aircraft actuator system may comprise first and second power transmission shafts for driving respective pluralities of actuators in respective wings of the aircraft, a braking device being provided for each power transmission shaft. In various examples of the disclosure, the power transmission shafts may be coupled such that operation of one braking device will stop rotation of both power transmission shafts.

BRIEF DESCRIPTION OF DRAWINGS

An example of this disclosure will now be described, by way of example only, with reference to the accompanying drawings in which:

FIG. 5A shows a sectional view along line C-C of FIG. 2 in the second operating condition of the brake;

FIG. 5B shows a sectional view along line C-C of FIG. 2 in the first operating condition of the brake;

DETAILED DESCRIPTION

Figure 1:
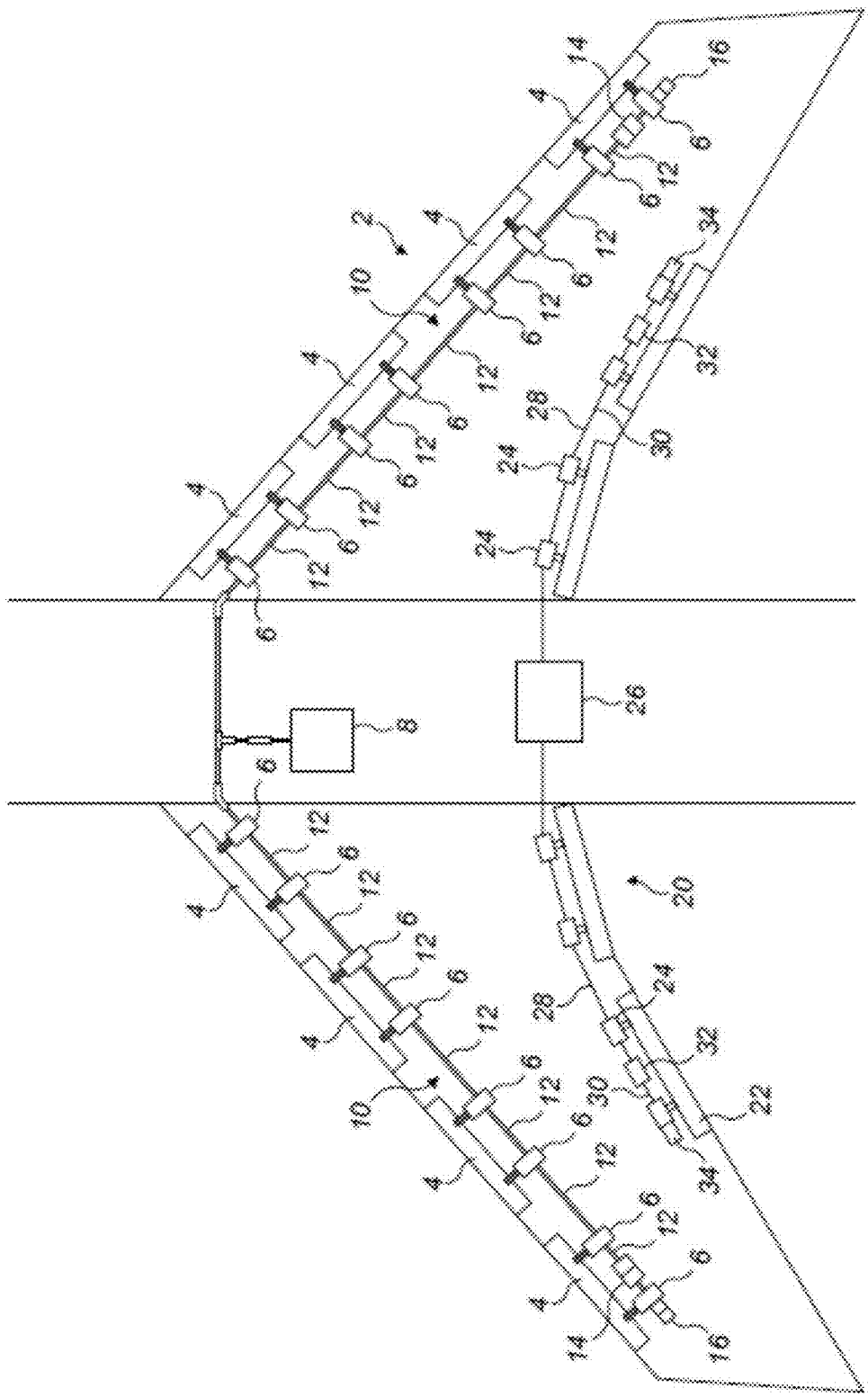
FIG. 1 shows an aircraft system comprising a plurality of actuators and a brake.

FIG. 1 illustrates an aircraft slat operating system 2. The system comprises a plurality of leading edge slats 4 on each wing which are selectively deployed and retracted by rotary actuators 6. Each actuator 6 is powered by a rotary drive from a common power drive unit 8. Drive is transmitted from the power drive unit 8 via a power transmission shaft 10, typically comprising one or more rotationally coupled sections 12, which connects the actuators 6 in series.

Out board brakes (OBBs) 14 and asymmetry sensors 16 are also included in a typical system. The OBBs 14 and asymmetry sensors 14 are typically arranged at the ends of the respective power transmission shafts 10. In an aircraft slat system 2, it is important that the slats 4 operate in a symmetrical manner. If they do not, then the aircraft wings would be subjected to undesirable unbalanced aerodynamic forces. The asymmetry sensors 16 sense any differences in the speed or direction of rotation between the transmission shafts 10 and if an asymmetry is sensed, the OBBs 12 on both wings are activated to stop the rotation of both power transmission shafts 10. This ensures that the slats 4 will remain symmetrically deployed on both wings.

Also illustrated is an aircraft flap operating system 20. This system 20 comprises a plurality of trailing edge flaps 22 which are selectively deployed and retracted by rotary actuators 24. Each actuator 24 is powered by a rotary drive from a common power drive unit 26. Drive is transmitted from the power drive unit 26 via a power transmission shaft 28, typically comprising one or more rotationally coupled sections 30, which connects the actuators 6 in series.

Out board brakes (OBBs) 32 and asymmetry sensors 34 are also included in a typical flap operating system. The OBBs 32 and asymmetry sensors 34 are typically arranged at the end of the respective power transmission shafts 28. As for the slat system 2, the asymmetry sensors 34 sense any differences in the speed or direction of rotation between the transmission shafts 28 on the two wings and if an asymmetry is sensed, the OBBs 32 on both wings are activated to stop the rotation of both power transmission shafts 28. This ensures that the flaps 22 will remain symmetrically deployed on both wings.

The slat and flap operating systems 2, 20 may also have other sensors such as slat or skew sensors (not shown) which may also cause operation of the respective OBBs 14.

This disclosure concerns the construction of a brake device which may advantageously be employed as an OBB in aircraft systems such as those discussed above. The brake device may be particularly advantageously employed in thin wing aircraft applications in which the brake device must fit within a very limited space envelope. Of course, the device is not limited to such applications and it may be more widely used. In a traditional OBB, the brake comprises a stack of interleaved static and dynamic plates which are brought into contact to effect frictional braking. However, during normal operation, there may be some frictional or viscous drag created between the plates which produces an unwanted load on an associated power unit. The provision of a stack of interleaved static and dynamic plates may also lead to the brake device being relatively large in size. The examples of the disclosure described hereinafter may mitigate such problems by using an alternative form of braking.

FIGS. 2 to 6B illustrate a brake device 40 in accordance with this disclosure.

Figure 2:
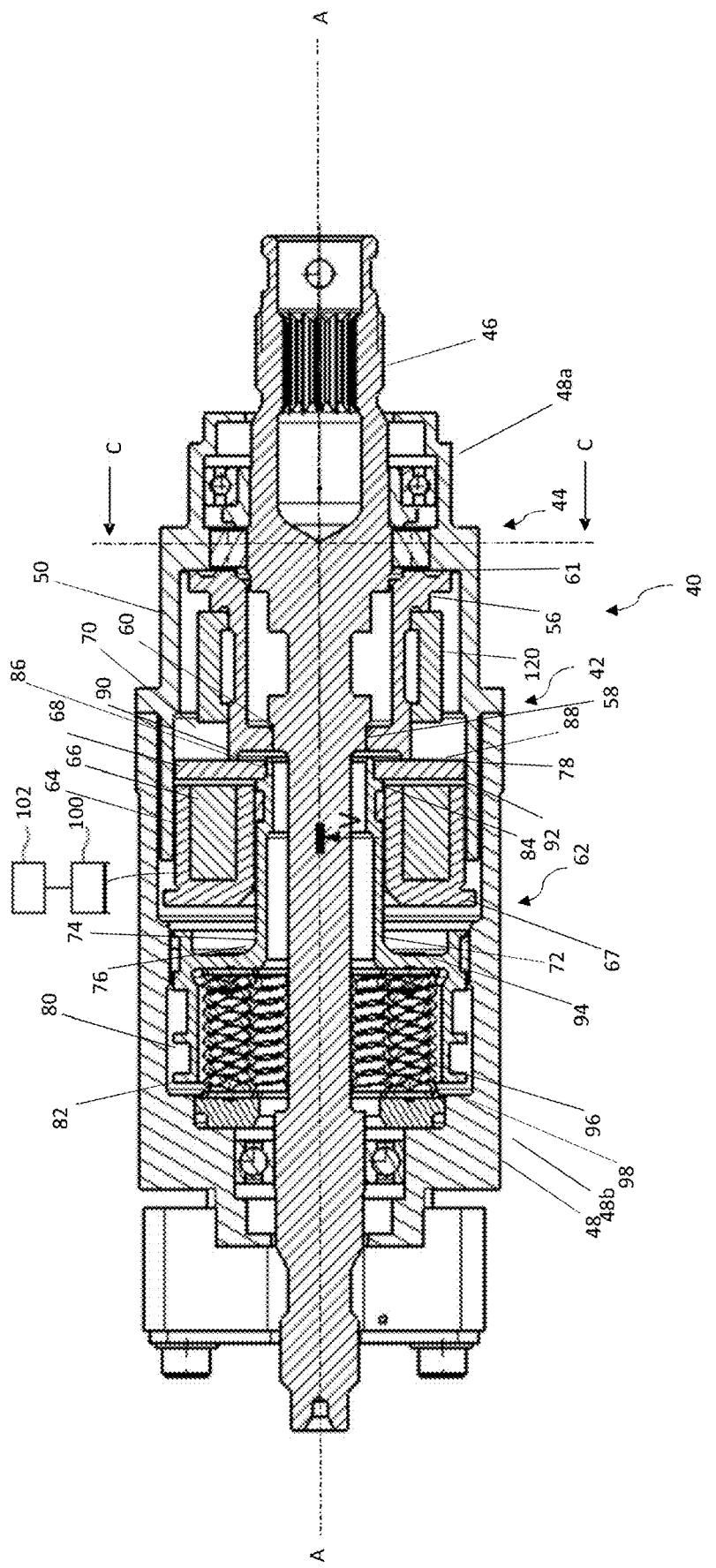
FIG. 2 shows a schematic vertical cross sectional view through a brake in accordance with this disclosure, in a first, braking operating condition.
Figure 3:
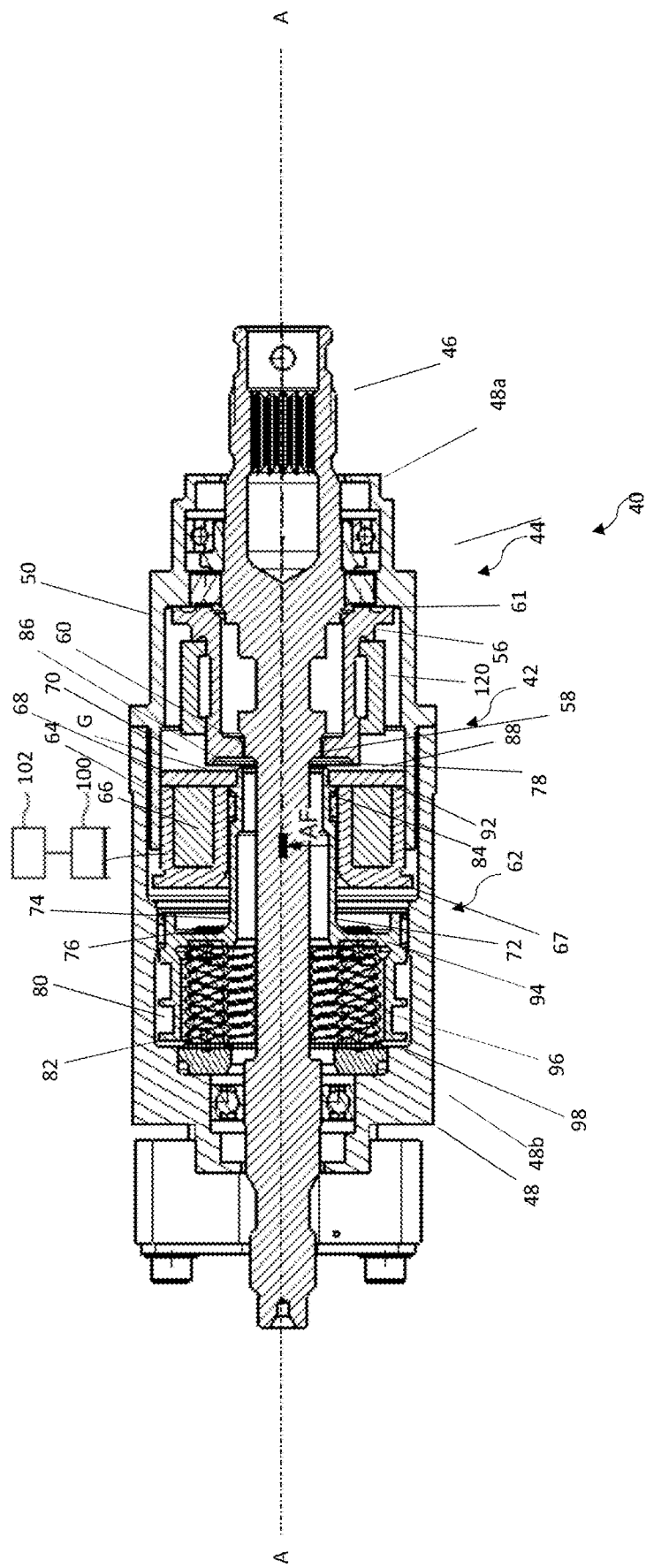
FIG. 3 shows a schematic vertical cross sectional view through the brake of FIG. 2, in a second, non-braking operating condition.
Figure 4A:
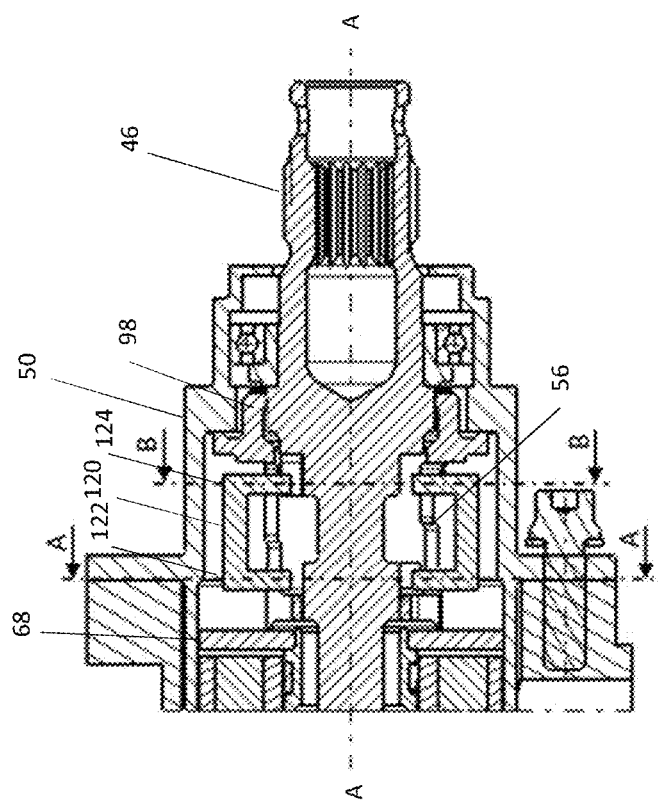
FIG. 4A shows a sectional view along line V-V of FIG. 2 in the first operating condition of the brake.
Figure 4B:
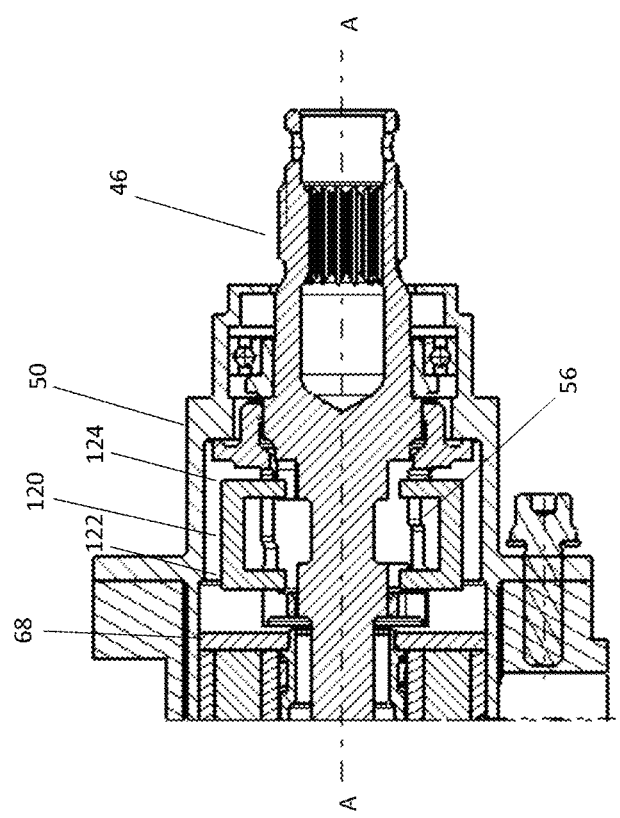
FIG. 4B shows a sectional view along line V-V of FIG. 2 in the second operating condition of the brake.

With reference to FIGS. 2 and 3, the brake device 40 broadly comprises a trigger brake 42 and a roller jamming mechanism 44. As will be described further below, triggering of the trigger brake 42 will cause operation of the roller jamming mechanism 44 which will stop the rotation of an input shaft 46 of the brake device 40.

The input shaft 46 of the brake device 40 is adapted to rotate about the central longitudinal axis A-A thereof so as to provide a torque for driving a device (not shown). In one non-limiting example, the device may comprise a rotary actuator 24 for a trailing edge flap 22 of an aircraft as described above.

In more detail, the brake device 40 comprises a housing 48 which mounts the various components of the device 40. In the example shown, the housing 48 is annular in cross section and extends along a length of the input shaft 46 such that a wall 50 of the housing 48 extends coaxially with and radially outward of the input shaft 46. In the example shown, the housing 48 comprises a first housing part 48a and a second housing part 48b, the first and second housing parts 48a and b being configured to mate telescopically and to be assembled around the various components of the device 40 after they have been assembled. It will be understood that in any example of the disclosure, the housing 48 could instead be formed as a single part.

The housing 48 is fixed (for example by being fixed to part of an aircraft) such that is does not rotate about the central longitudinal axis A-A. Thus, the input shaft 46 may rotate relative to the housing 48. In an alternative example, the housing 48 may be adapted to rotate about the central longitudinal axis A-A at a different speed and/or direction to the speed of rotation of the input shaft 46 such that the input shaft 46 may rotate relative to the housing 48, The trigger brake 42 comprises a trigger brake shaft 56 mounted within the housing 48. In the example shown, the trigger brake shaft 56 is annular in cross section and the input shaft 46 extends through the trigger brake shaft 56.

The trigger brake shaft 56 is mounted in the housing 48 such that it may rotate around the central longitudinal axis A-A with the input shaft 46. The trigger brake shaft 56 is also mounted so as to allow a limited amount of movement along the axis A-A relative to the housing 48 as will be described further below.

In one example, a radially inner surface 58 of the trigger brake shaft 56 may be slidably and rotatably mounted on the radially outer surface 60 of the input shaft 46.

A surface of the trigger brake shaft 56 is engageable with the housing 48 (i.e. with a contact surface of a static element which may be provided by the housing 48) to effect a frictional braking of the trigger brake shaft 56. In the example shown, the surface is a radial surface 61 provided on the trigger brake shaft 56 and configured to engage with a radial surface of the housing 48. The housing 48 and the trigger brake shaft 56 may be formed of any suitable material to allow the frictional braking to be effected. In one example of the disclosure, both the housing 48 and the trigger brake shaft 56 may be formed from a carbon steel or a similar material. The radial surface 61 and the radial surface of the housing 48 may be machined to improve the friction properties thereof if required.

To effect the engagement, a trigger brake actuator 62 is provided. In the example illustrated, the trigger brake actuator 62 is an electro-mechanical actuator, although other forms of actuator, for example hydraulic or pneumatic actuator may be used.

The electro-mechanical actuator 62 disclosed comprises one or more solenoids 64 having a coil or coils 66 mounted within a solenoid housing 67 and an armature 68 mounted for reciprocating movement within an inner bore 70 of the housing 48. The armature 68 may, for example be slidably mounted in the inner bore 70 and comprises an annular plate extending around the input shaft 46 and radially outwardly towards the housing 48.

In the example shown, the armature 68 may be mounted on a carrier member 72. The carrier member 72 extends around the input shaft 46 so as to form a substantially cylindrical body which extends parallel to the input shaft 46 and which forms a bore within which the input shaft extends. The carrier member 72 has a radially outer surface 74. In the example shown, the carrier member 72 is provided adjacent the trigger brake shaft 56 such that the trigger brake shaft 56 extends along a first axial extent of the input shaft 46 and the carrier member 72 extends along a second, distinct axial extent of the input shaft 46.

The carrier member 72 comprises a first portion 76 extending axially from a first axial end 78 of the carrier member 72 away from the trigger brake shaft 56 and a second axial portion 80 extending axially from the first portion 76 to a second axial end 82 of the carrier member 72.

A shoulder 84 extends radially outwardly from the first portion 76 of the carrier member 72 at a location spaced from the first axial end 78 of the carrier member 72. The armature 68 is mounted on the carrier member 72 such that a radially inner surface 86 of the armature 68 rests on the radially outer surface 74 of the carrier member 72. A first radial surface 88 of the armature 68 abuts against a first axial end 90 of the trigger brake shaft 56 and a second, opposite radial surface 92 of the armature 68 abuts against the shoulder 84.

The first portion 76 of the carrier member 72 extends axially from the shoulder 84 toward the second axial end 82 of the carrier member 72. Two or more (for example four) solenoids 64 are slidably mounted on the radially outer surface 74 of the first axial portion 76 of the carrier member 72 so as to be circumferentially spaced around the input shaft 46 such that the armature 68 is positioned axially between the solenoids 64 and the trigger brake shaft 56.

The second axial portion 80 of the carrier member 72 adjacent the second axial end 88 thereof has a greater diameter bore than the bore of the first axial portion 76 of the carrier member 72. A radial wall 94 extends between and joins the first axial portion 76 to the second axial portion 80.

A biasing member, for example a coil spring 96, is received between an end wall 98 of the inner bore 70 of the housing 48 and the radial wall 94. Of course other forms of biasing member may be used. The biasing member is configured to push against the radial wall 94 and so acts to bias the carrier member 72 and the armature 68 mounted thereon axially towards the trigger brake shaft 56.

It will be appreciated that in the example shown, the brake actuator 62 and the trigger brake 42 are positioned so as to be axially adjacent to one another, thus allowing the diameter of the braking device and hence the diameter or radial extent of the envelope required to receive the braking device 40 to be reduced relative to other designs. The required diameter may be further reduced by providing the biasing member axially adjacent to the trigger brake actuator 62 as in the example of FIGS. 2 and 3.

In the example shown, the armature 68 is movable axially with the carrier member 72 between the position illustrated in FIG. 2 in which it contacts the trigger brake shaft 56, pushing the trigger brake shaft 56 axially into engagement with the housing 48 thereby triggering the trigger brake 42, and the position illustrated in FIG. 3 in which it is held against the solenoids 64 such that the trigger brake shaft 56 is not in engagement with the housing 48 or is not pushed against the housing 48 to trigger the trigger brake 42. In this position, a gap G may be provided between the armature 68 and the trigger brake shaft 56. In the context of an aircraft actuator system as discussed above, the position illustrated in FIG. 3 is a flight normal condition and the position illustrated in FIG. 2 is a fault or braking condition.

The solenoid coils 66 are connected to an electrical power supply 100 which is selectively energizable by means of a control 102. The control 102 may, in the context of the applications discussed above, be the asymmetry sensors 16, 34.

In the example illustrated, the solenoid 64 is normally energised in order to maintain the brake device 40 in the non-braking condition illustrated in FIG. 2. In the non-braking condition, the energised solenoid 64 holds the armature 68. This means that should a failure occur in the power supply 100, the armature 68 will move to the braking position shown in FIG. 3 under the force of the coil spring 96, thereby triggering the trigger brake 42. Similarly, when the power supply 100 is switched off by the control 102, the armature 68 will move to trigger the trigger brake 42.

The trigger brake 42 simply acts as a trigger for the braking effected by the brake device 40. The braking is achieved through the roller jamming mechanism 44 as will be described further below.

The braking force achieved through the roller jamming mechanism 44 is applied to the input shaft 46. The input shaft 46 may be a part of or coupled to a power transmission shaft (not shown) as disclosed above.

As can best be seen in FIGS. 5A and 5B, the input shaft 46 comprises a roller receiving surface 110 which receives a plurality of roller elements 112. The roller receiving surface 110 is provided with a plurality of symmetrical ramps 114 between which the roller elements 112 locate. The roller elements 112 are received within an annular bore 116 of the housing 48 which forms a static structure.

The trigger brake shaft 56 comprises a plurality of axially projecting teeth 118 which, as can be seen from FIGS. 5A and B extend between the roller elements 112. As will be explained further below, the roller elements 112, ramps 114, teeth 118 and annular bore 116 together forms a roller jamming mechanism 44.

Arranged around the trigger brake shaft 56 is mounted a machined torsion spring 120. In this example the torsion spring 120 is made from titanium or titanium alloy, although other materials may be used. The material of the spring 120 is chosen to provide the necessary strength and torsional compliance.

The torsion spring 120 has first and second axial ends 122, 124. The torsion spring 120 and the trigger brake shaft 56 and/or the drive shaft 46 are configured such that the torsion spring 120 is torsionally preloaded. In the example shown in FIGS. 6A and 6B, each end 122, 124 of the torsion spring 120 may be formed with a respective first 126, 128 and second 130, 132 diametrically opposed projection or lug which extend radially inward from the radially inner surface 134 of the torsion spring 120.

Figures 6A, 6B:
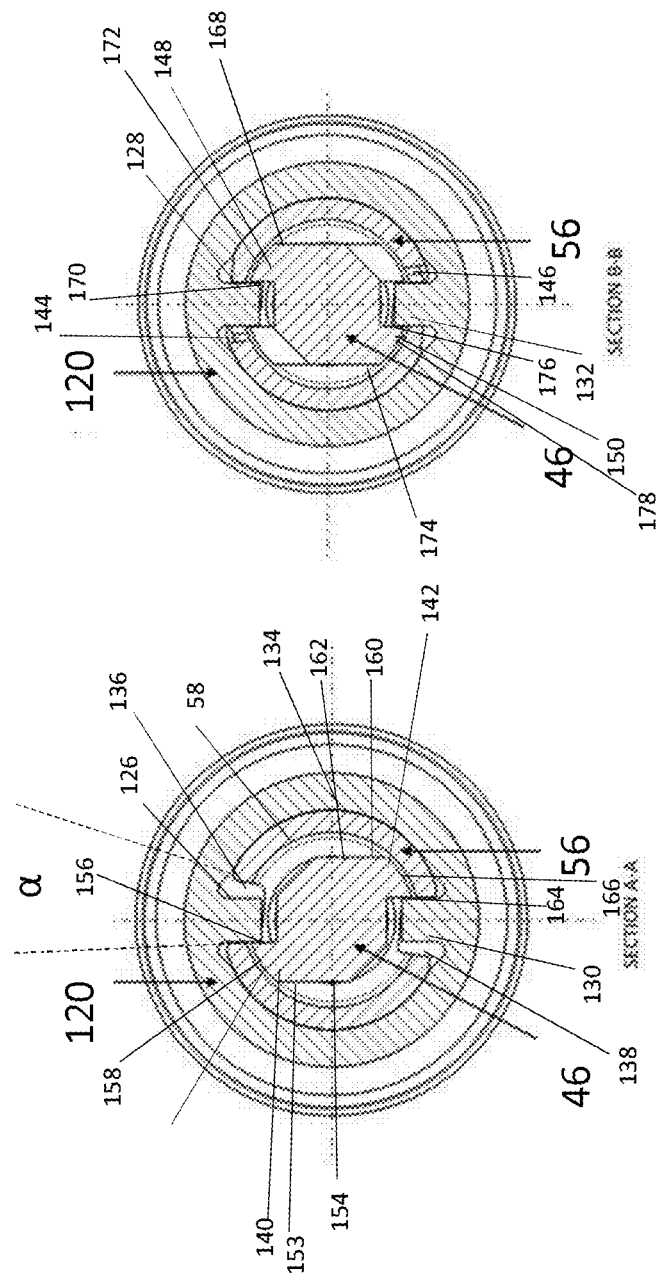
FIG. 6A shows a sectional view along line A-A of FIG. 4A in the first operating condition of the brake.
FIG. 6B shows a sectional view along line B-B of FIG. 4A in the first operating condition of the brake.

As illustrated in FIG. 6A, the first and second lugs 126, 130 at the first end 122 of torsion spring 120 extend through respective diametrically opposed openings 136, 138 provided in the trigger brake shaft 56 and engage with respective diametrically opposed first and second projections 140, 142 which extend outwardly from the input shaft 46.

The first and second lugs 128, 132 at the second end 124 of the torsion spring 120 extend through respective diametrically opposed openings 144, 146 provided in the trigger brake shaft 56 and engage with respective opposed third and fourth projections 148, 150 which extend outwardly from the drive shaft 46.

The input shaft 46 varies in cross section along its length. As seen in FIGS. 6A and 6B, the portions of the input shaft 46 adjacent the respective first and second axial ends 122, 124 of the torsion spring 120 may have an octagonal cross section. It will be understood however that the input shaft 46 could take other forms. For example, the cross section of the input shaft 46 could be hexagonal.

At the first end 122 of torsion spring 120 and as shown in FIG. 6A, a first projection 140 is provided on the input shaft 46 extending outwardly therefrom such that a first side surface 152 of the first projection 140 forms a continuation of a first one 154 of the eight faces of the input shaft 46. A second, opposite side surface 156 of the first projection 140 extends parallel to the first side surface 152 thereof. The radially outer surface 158 of the first projection 140 is curved so as to form a section of a cylindrical surface configured to follow the inner surface of the trigger brake shaft 56.

A second projection 142 is also provided on the input shaft 46 at the first end 122 of torsion spring 120 extending outwardly from the input shaft 46 in a direction opposite to that of the first projection 140. A first side surface 160 of the second projection 142 forms a continuation of the face 162 of the input shaft 46 located opposite the first face 154 thereof. A second, opposite side surface 164 of the second projection 142 extends parallel to the first side surface 160 thereof. The radially outer surface 166 of the projection 140 is curved so as to form a section of a cylindrical surface configured to follow the inner surface of the trigger brake shaft 56.

At the second end 124 of torsion spring 120 and as shown in FIG. 6B, a third projection 148 is provided on the input shaft 46 extending outwardly therefrom in the same direction as the first projection 140. A first side surface 168 of the third projection 148 forms a continuation of the face 162 of the input shaft 46 located opposite the first face 154 thereof. A second, opposite side surface 170 of the third projection 148 extends parallel to the first side surface 168 thereof. The radially outer surface 172 of the third projection 148 is curved so as to form a section of a cylindrical surface configured to follow the inner surface of the trigger brake shaft 56.

A fourth projection 150 is also provided on the input shaft 46 at the second end 124 of torsion spring 120 extending outwardly from the input shaft 46 in a direction opposite to that of the third projection 148. A first side surface 174 of the fourth projection 150 forms a continuation of the first face 154 of the input shaft 46. A second, opposite side surface 176 of the fourth projection 150 extends parallel to the first side surface 174 thereof. The radially outer surface 178 of the fourth projection 150 is again curved so as to form a section of a cylindrical surface configured to follow the inner surface of the trigger brake shaft 56.

Each opening 136, 138, 144, 146 in the trigger brake shaft 56 is circumferentially larger than the lug 126, 130, 128, 132 which it receives, having an angular extent $\alpha$. This will allow relative rotational movement between the input shaft 46 and the trigger brake shaft 56 as will be described further below. In this embodiment the angle $\alpha$ may be between 10 and 15° for example.

The torsion spring 120 is torsionally preloaded when the brake is in the second, non-braking operating condition. That is, the first and second ends 122, 124 of the torsion spring 120 are rotated in opposite directions from one another from the spring's rest position.

In operation, the drive shaft 46 may rotate in either a clockwise or counter-clockwise direction, depending, for example, on the required direction of rotation of an actuator. Torque is transmitted between the input and trigger brake shafts 46, 56 of the brake device 40 when the input shaft 46 is rotating in a counter-clockwise direction in the sense of FIGS. 6A and 6B.

In this mode of operation, the counter-clockwise facing side surfaces 170, 176 of the third and fourth projections 148, 150 on the input shaft 46 transmit torque to the first and second lugs 128, 132 at the second end 124 of the torsion spring 120. This torque is then transmitted into the second end 124 of the torsion spring 120, through the torsion spring 120 into the first end 122 of the torsion spring 120 and from there into the first and second lugs 126, 130 at the first end 122 of torsion spring 120. The first and second lugs 126, 130 at the first end 122 of torsion spring 120 then transmit the torque to the clockwise facing side surfaces 156, 164 of the first and second projections 126,130 on the trigger brake shaft 56, thereby causing the trigger brake shaft 56 to rotate. The trigger brake shaft 56 will rotate at the same speed as the input shaft 46, so that there is no relative rotation between the two shafts.

Torque is also transmitted between the input and trigger brake shafts 46, 56 of the brake device when the input shaft 46 is rotating in a clockwise direction in the sense of FIGS. 6A and 6B.

In this mode of operation, the clockwise facing side surfaces 156, 164 of the first and second projections 126,130 on the input shaft 46 transmit torque to the first and second lugs 126, 130 at the first end 122 of torsion spring 120. This torque is then transmitted into the first end 122 of the torsion spring 120, through the torsion spring 120 into the second end 124 of the torsion spring 120 and from there into the first and second lugs 128, 132 at the second end 124 of the torsion spring 120. The first and second lugs 128, 132 at the second end 124 of torsion spring 120 then transmit the torque to the counter-clockwise facing side surfaces 170,

176 of the third and fourth projections 148, 150 on the trigger brake shaft 56, thereby causing the trigger brake shaft 56 to rotate with the input shaft 46. Again, the trigger brake shaft 56 will rotate at the same speed as the input shaft 46, so that there is no relative rotation between the two shafts.

Of course, rotation of the trigger brake shaft 56 with the input shaft 46 is only possible when the trigger brake solenoid 62 is energised. In the event that the solenoid becomes de-energised, the trigger brake shaft 56 will move axially into frictional engagement with the housing 48 and brake the rotation of the trigger brake shaft 56. It will be appreciated that the arrangement shown in which the lugs on the torsion spring contact projections on the trigger brake shaft allows for retained contact between the respective parts when the trigger brake shaft 56 moves axially relative to the input shaft 46. Braking the rotation of the trigger brake shaft 56 will result in the preload of the torsion spring 120 being exceeded.

When the preload is exceeded, the torsion spring 120 rotates the first and second lugs 126, 130 at the first end 122 of torsion spring 120 relative to the first and second lugs 128, 132 at the second end 124 of the torsion spring 120, permitting relative rotation of the input and brake trigger shafts 46, 56 relative to one another. Once there is relative movement between these shafts 46, 56, the roller elements 112 in the jamming mechanism will be forced up the ramps 114 on the roller receiving surface 110 of the input shaft 46 by the teeth 118 of the trigger brake shaft 56, thereby forcing the roller elements 112 into wedged contact with the annular surface 116 of the housing 48, thereby stopping the rotation of the input shaft 46.

Due to the symmetrical configuration of the ramps 114, the device will operate at the same degree of relative angular displacement irrespective of the direction of rotation of the input shaft 46.

The aim of the brake device 40 is to operate as quickly as possible after a fault occurs to stop the input shaft 46 as soon as possible. The torque value with which the brake device 40 will operate is determined by the torsional spring rate of the torsion spring 120 and the degree of preload. In the embodiment described above, the jamming mechanism 44 is activated with about 5° to 7°, for example 6°, of relative rotational movement of the input and trigger brake shafts 46, 56.

It will be appreciated that if the brake device 40 is embodied in a system as illustrated in FIG. 1, as soon as the brake device 40 operates, it will stop the rotation of the entire associated power transmission shaft 10, 28. This will stop operation of all actuators 6, 24 driven by the power transmission shaft 10, 28.

As discussed above, in such a system, the brake device 40 may be operated in response to a signal from the asymmetry sensors 16, 34 which may indicate a fault such as a failure in one of the power transmission shafts 10, 28. In that event, both OBBs 14, 32 may be operated to stop both power transmission shafts 10, 28 connected to an associated power drive unit 8, 26. This will prevent asymmetrical deployment of the slats 4 or flaps 22. Alternatively, just one of the OBBs 14, 32 may be activated as the transmission shafts 10, 28 may be coupled together such that when one stops rotating, so does the other.

It will be appreciated that the embodiment described herein has a number of advantages over the prior art braking systems. Specifically, the trigger brake 42 does not need any braking elements as the braking force of the brake unit 40 is not generated by those elements, but by the roller jamming mechanism 44. The braking force provided by the contact between the housing 48 and the trigger brake shaft 56 need only be sufficiently large to overcome the preload of the torsion spring 120 so as to brake the trigger brake shaft 56. While there may be a certain drag associated with the contact between the housing 48 and the trigger brake shaft 56, this will be much smaller than that of braking elements which would be required to brake the entire system. This represents less power absorbed in the brake unit 40, which will potentially allow for a less powerful and therefore lighter power drive unit.

Further, friction surfaces may be machined onto the housing 48 and the trigger brake shaft 56 in examples of the disclosure such that the friction surfaces can be controlled to be flat and square. Further, separation between the friction surfaces on the housing 48 and the trigger brake shaft 56 is controlled by the gap G between the armature 68 and the trigger brake shaft. Thus, the drag associated with the friction surfaces of the present disclosure may be less than that arising from the use of multiple thin friction plates or braking elements to brake rotation of the trigger brake shaft.

In view of the arrangement of the torsion spring 120 around the input and trigger brake shafts 46, 56, the brake unit 40 provides a relatively compact construction, which is advantageous in restricted operating spaces, such as aircraft wings. As discussed above, the axial arrangement of the biasing means, the brake actuator and the trigger brake may also allow the required diameter of a brake unit according to the disclosure to be further reduced. This may be advantageous in a restricted operating space and, especially in thin wing aircraft applications. Also, the desired degree of preload of the torsion spring 120 can be easily set.

The above description is of an exemplary embodiment only, and it will be clear that modifications may be made to the embodiment without departing from the scope of the disclosure. For example, while the trigger brake shaft 56 of the brake device 40 has been illustrated as a single component, it may be formed as a number of components suitably joined or coupled together.

In addition, while a machined torsion spring 120 has been disclosed, other torsion springs may be used, for example coil springs. Machined torsion springs may, however, be advantageous in that they facilitate providing integrated spring ends for receiving the coupling pins.

Also, while the brake device 40 has been disclosed as being used in an aircraft actuator system, it may of course be used in any application where braking of a rotary shaft is required. Examples of such applications may include automotive parking brakes and elevator, escalator and moving walkway brakes.

The invention claimed is:

1. A brake device for braking rotation of an input shaft, comprising:
   a selectively operable trigger brake comprising:
   a static element;
   a trigger brake shaft mounted for rotational and axial movement relative to the static element and the input shaft;
   a preloaded torsion spring rotationally coupled to the input shaft but permitting a limited rotational movement between the trigger brake shaft and the input shaft;
   a roller jamming mechanism operable upon the relative rotation between the trigger brake shaft and the input shaft exceeding a predetermined amount to stop rotation of the input shaft upon operation of the trigger brake; and a brake actuator for selectively moving the trigger brake shaft into and out of engagement with a contact surface of the static element;

wherein the engagement of the contact surface of the static element and the trigger brake shaft overcomes the preload of the torsion spring so as to produce a relative rotation between the trigger brake shaft and the input shaft to operate the roller jamming mechanism.

2. The brake device as claimed in claim 1, wherein the trigger brake and the brake actuator are arranged axially adjacent to each other.

3. The brake device as claimed in claim 1, wherein the static element comprises a housing of the brake device.

4. The brake device as claimed in claim 3, wherein the trigger brake shaft or the brake actuator are mounted in the housing.

5. The brake device as claimed in claim 1, wherein a radial surface of the trigger brake shaft is axially engageable with the static element to affect a frictional braking of the trigger brake shaft.

6. The brake device as claimed in claim 1, wherein the brake actuator comprises an electro-mechanical actuator.

7. The brake device as claimed in claim 6, wherein said brake actuator comprises:

an actuating element which is movable between a non-braking position and a braking position under the force of a biasing member, the actuating element being held in the non-braking position against the force of the biasing member when the brake actuator is energised and released upon de-energisation of the brake actuator.

8. The brake device as claimed in claim 7, further comprising:

a carrier member extending parallel to the input shaft, wherein the carrier member is adapted for axial movement relative to the static element and wherein the actuating element is mounted on the carrier member, wherein the biasing member is adapted to bias the carrier member and the actuating element axially towards the contact surface of the static element.

9. The brake device as claimed in claim 8, wherein the brake actuator is mounted relative to the carrier member such that the actuating element is positioned axially between the brake actuator and the trigger brake shaft.

10. The brake device as claimed in claim 7, wherein the brake actuator comprises one or more solenoids, and wherein the actuating element comprises an annular armature extending around the input shaft.

11. The brake device as claimed in claim 1, wherein the roller jamming mechanism comprises:

a plurality of ramp surfaces provided on the input shaft;
a static structure of the device;
a plurality of roller elements arranged between the input shaft and the static structure and received between adjacent ramp surfaces; and an actuator coupled to the trigger brake shaft for moving the roller elements along the ramp surfaces upon relative rotation of the trigger brake shaft and the input shaft.

12. The brake device as claimed in claim 11, wherein the actuator comprises a plurality of teeth extending between adjacent roller elements, the teeth optionally projecting from one end of the trigger brake shaft.

13. A drive system comprising:
the brake device as claimed in claim 1; and
a power transmission shaft coupled to or integrally formed with the input shaft of the brake device.

14. An aircraft actuator system comprising:
the drive system as claimed in claim 13, the power transmission shaft driving a plurality of actuators for deploying or retracting a plurality of slats or flaps in a wing of the aircraft, wherein stopping rotation of the input shaft of the brake device stops rotation of the power transmission shaft and thus deployment or retraction of the slats or flaps.

15. The aircraft actuator system as claimed in claim 14, comprising:

first and second power transmission shafts for driving respective pluralities of actuators in respective wings of the aircraft;

the braking device for each power transmission shaft;
wherein the power transmission shafts are coupled such that operation of one braking device will stop rotation of both power transmission shafts.

16. A brake device for braking rotation of an input shaft, comprising:

a selectively operable trigger brake comprising:
a static element;
a trigger brake shaft mounted for rotational and axial movement relative to the static element and the input shaft;
a preloaded torsion spring rotationally coupled to the input shaft but permitting a limited rotational movement between the trigger brake shaft and the input shaft;
a roller jamming mechanism operable upon the relative rotation between the trigger brake shaft and the input shaft exceeding a predetermined amount to stop rotation of the input shaft upon operation of the trigger brake; and
a brake actuator that selectively moves the trigger brake shaft into and out of engagement with a contact surface of the static element;

wherein the engagement of the contact surface of the static element and the trigger brake shaft overcomes the preload of the torsion spring so as to produce a relative rotation between the trigger brake shaft and the input shaft to operate the roller jamming mechanism.

* * * * *